June 26, 1934.    E. J. BRASSEUR    1,964,499
APPARATUS FOR MAKING STENCIL SHEETS
Filed Jan. 16, 1932    6 Sheets-Sheet 1

INVENTOR
ERNEST J. BRASSEUR
BY Lewis A. Wright
ATTORNEY

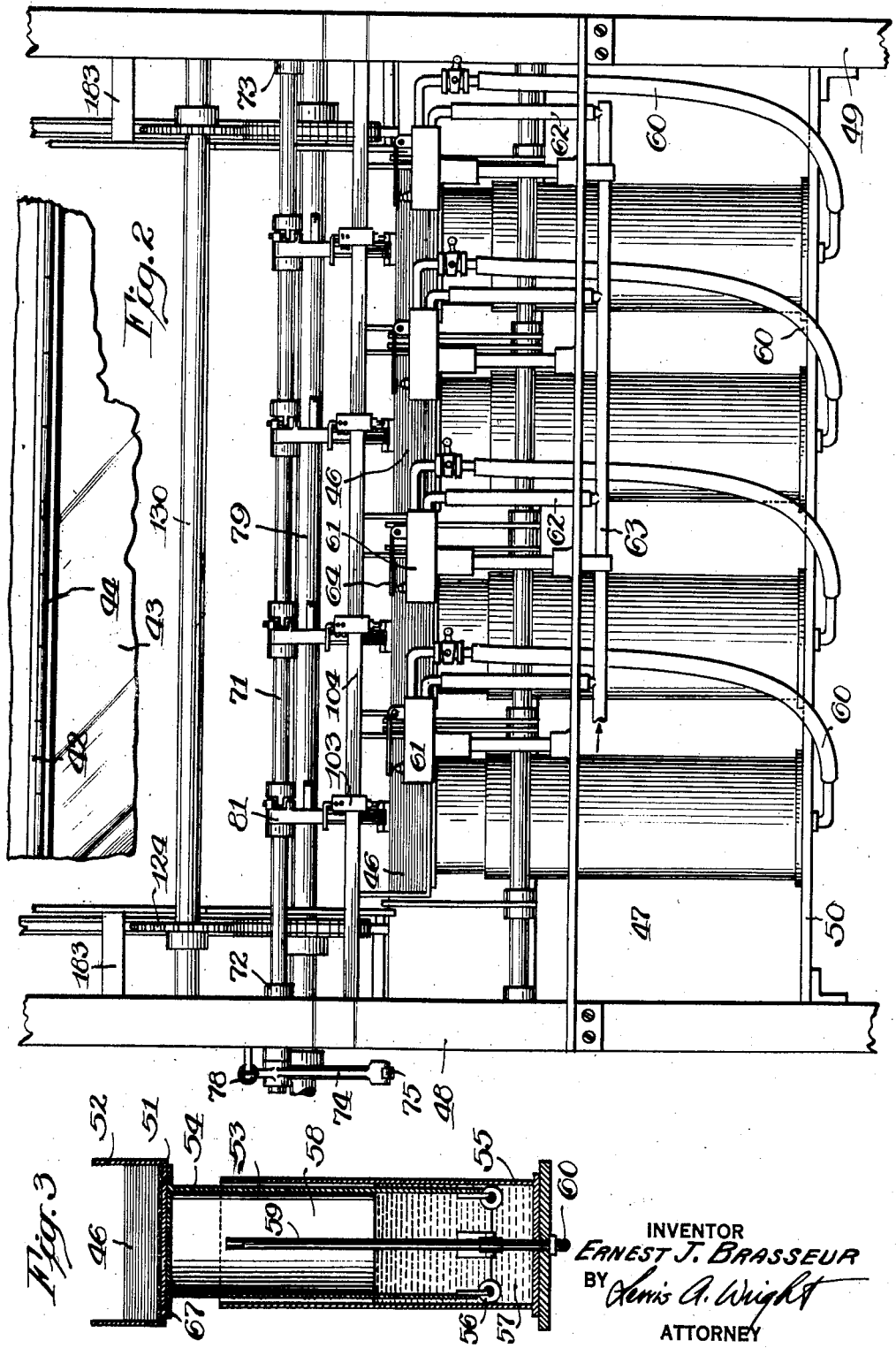

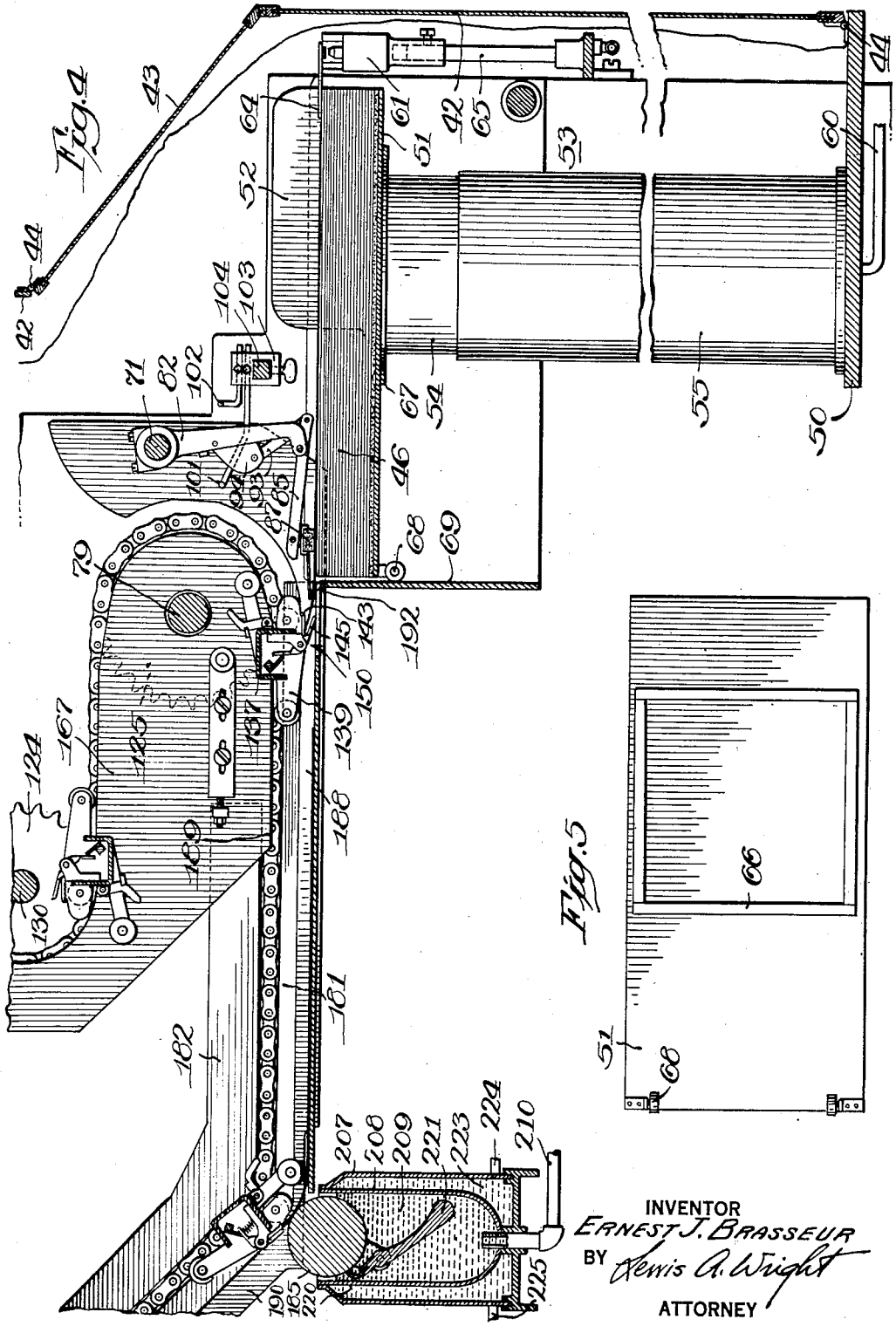

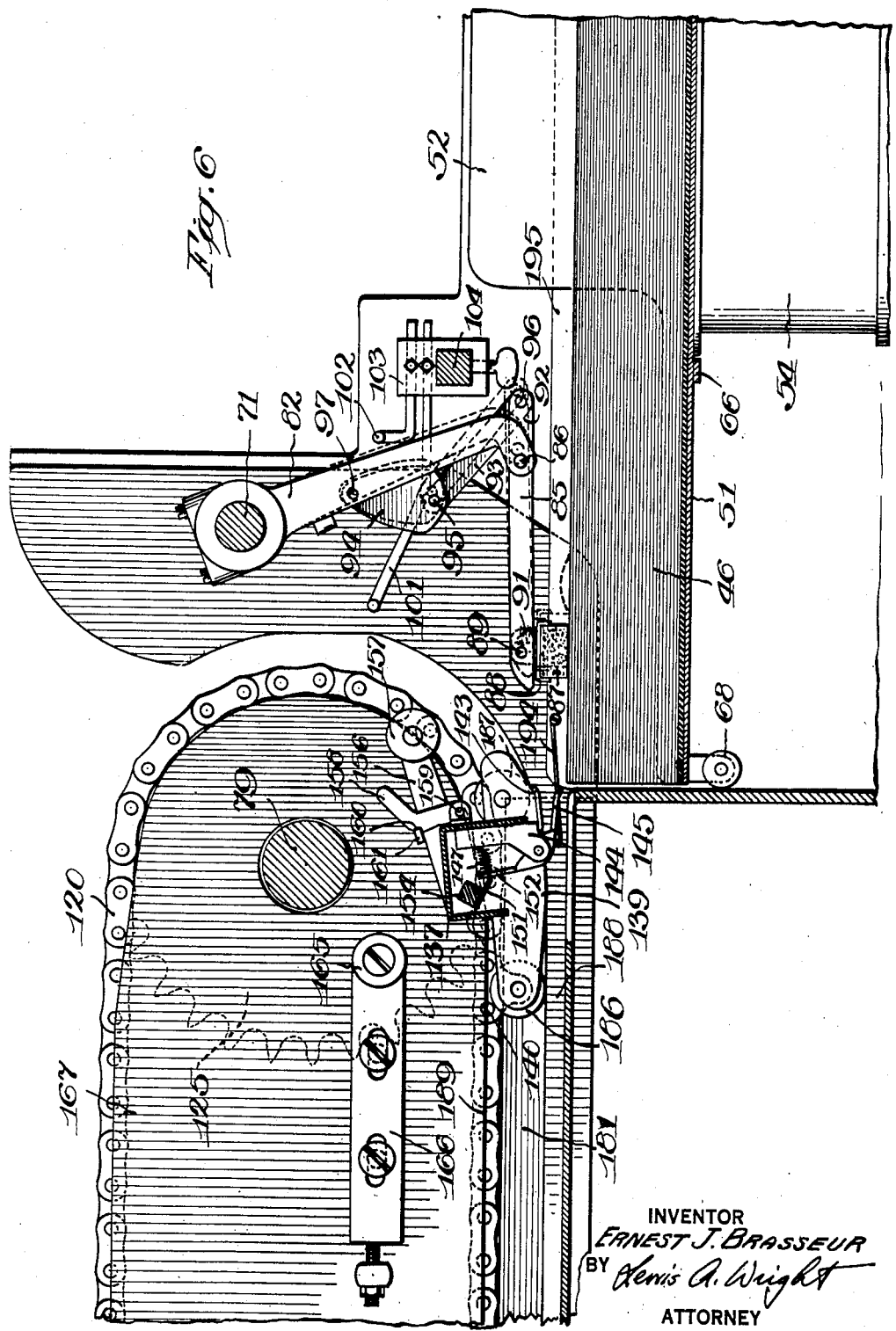

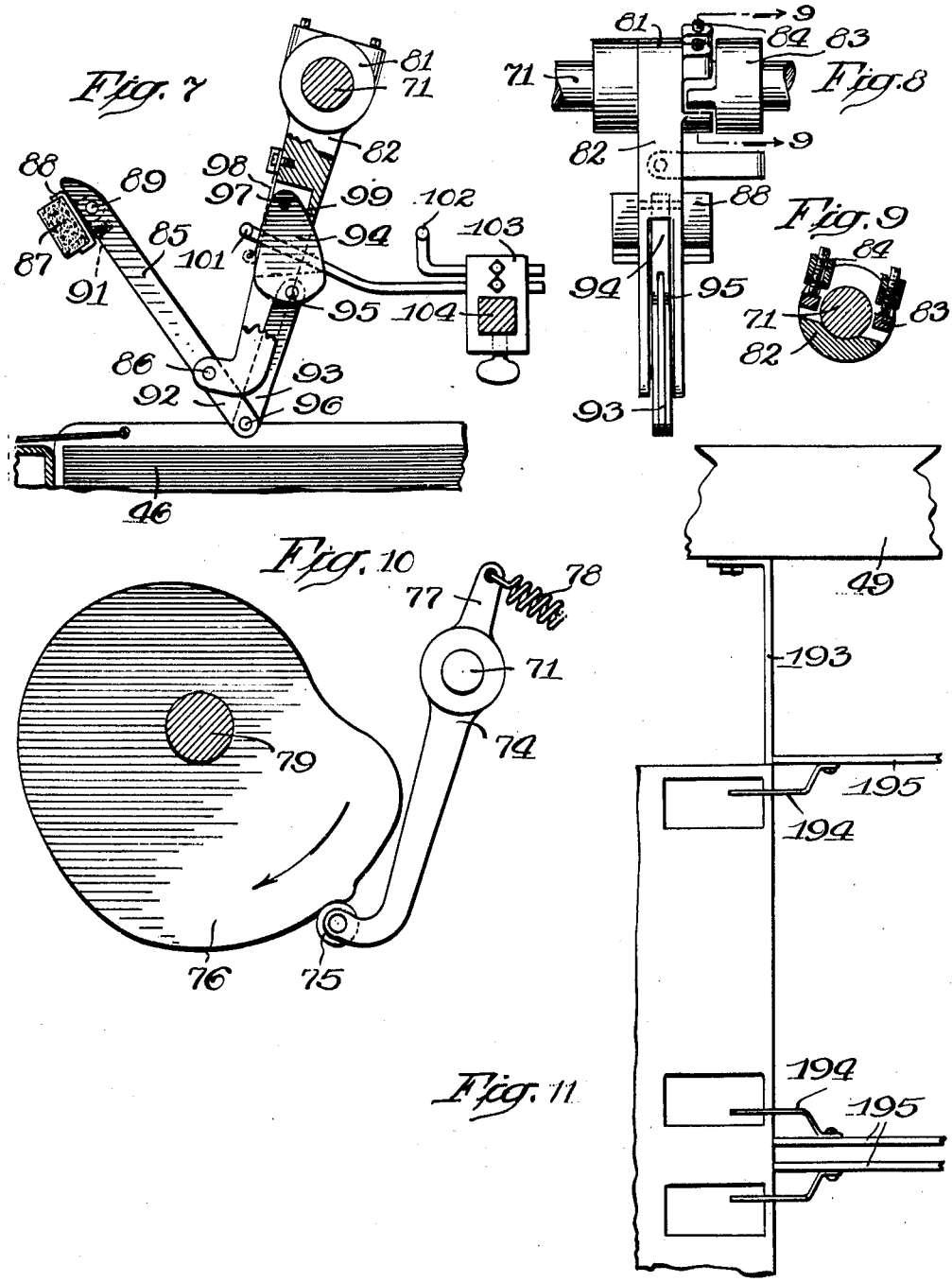

Patented June 26, 1934

1,964,499

UNITED STATES PATENT OFFICE 1,964,499

APPARATUS FOR MAKING STENCIL SHEETS

Ernest J. Brasseur, Winnetka, Ill., assignor to A. B. Dick Company, Chicago, Ill., a corporation of Illinois Application January 16, 1932, Serial No. 587,116

13 Claims. (Cl. 271—10)

This invention relates to an improvement in the art of making type-impressible stencil sheets for duplicating machines. Such stencil sheets usually consist of a foundation or base sheet of "Yoshino", or other large pored absorbent paper, impregnated or coated with the type-impressible material. In my prior application, Serial No. 490,156, filed October 21st, 1930, is disclosed an apparatus for automatically and continuously producing the stencil sheets, having a conveyor means for dragging a porous base sheet over and in contact with a surface coated with a solution of the type-impressible material to impregnate or coat the base sheet with the proper amount of type-impressible material, a drying chamber through which the conveyor means transports the impregnated sheet to evaporate or dry out the solvent from the type-impressible material, a receptacle in which the conveyor means deposits the properly dried sheets and feed means for supplying the conveyor means with a fresh base sheet.

The present invention constitutes an improvement thereon, and provides means whereby the supply of base sheets to the conveyor feeding means is effected automatically and continuously from a pile or stack, thus obviating the necessity for manual attention to said feeding means except for the replenishment of the pile at relatively long intervals, and which permits the entire operation of feeding, coating, and drying the stencil sheet to be performed under cover and under controlled conditions.

More particularly, the apparatus of the present invention includes a supporting table for the stack or pile of base sheets to be fed to the conveyor means, a table elevator for maintaining the top of the stack at the proper level for feeding, feeding mechanism for automatically and successively advancing the top sheet of the pile to the conveyor, and means for automatically operating the feeding mechanism in timed relation to the conveyor means.

The preferred form of the invention is illustrated in the accompanying drawings, in which:

Fig. 2 is a front elevation of the device shown in Fig. 1;

Fig. 3 is a detailed section through the table elevating device;

Fig. 4 is a vertical section to a larger scale taken substantially on the line 4—4 of Fig. 1;

Fig. 5 is a bottom plan view of the pile supporting tray shown in Fig. 4;

Fig. 6 is an enlarged sectional view, similar to Fig. 4, showing the parts of the sheet feeding mechanism in a different position;

Fig. 7 is a detailed view of the sheet feeding arm and associated parts, showing the feed lever and shoe in elevated position;

Fig. 8 is a detailed view of the feed shaft, showing the adjustable connection of the feed arm thereto;

Fig. 9 is a detailed section taken substantially on the line 9—9 of Fig. 8;

Fig. 10 is a detailed view of the actuating cam and follower for the feed shaft;

Fig. 11 is a plan view showing the paper guides or leaders to prevent curling of the base sheets.

Figure 1:
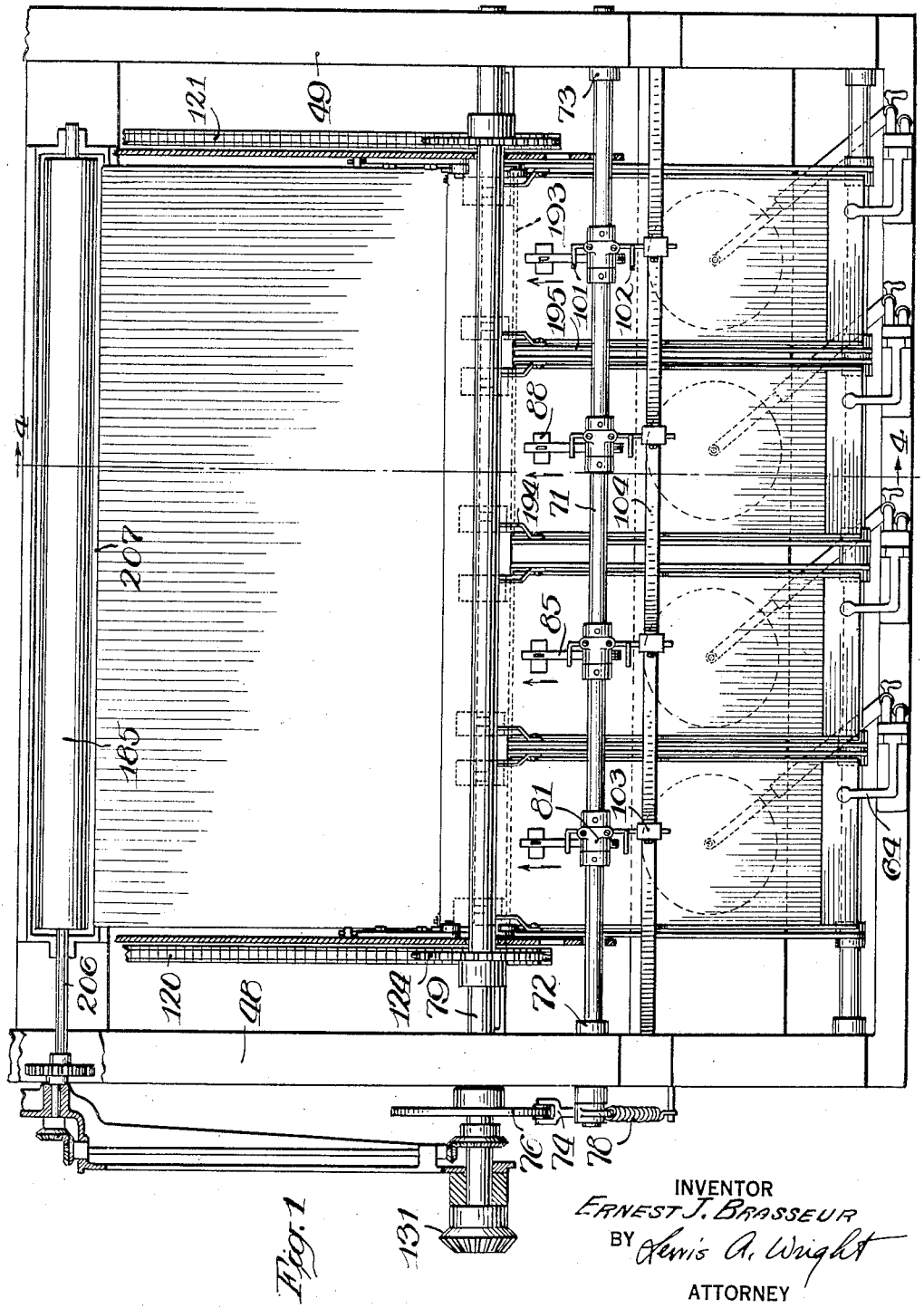
Fig. 1 is a plan view of the front or intake end of the apparatus.

The stencil making apparatus illustrated in the drawings is adapted to operate upon the base sheets and convert them into stencil sheets in batches of four, although the apparatus may be arranged to impregnate and dry the sheets in batches of any convenient number. The rate of production, that is, the speed of travel of the conveyor or transport member is determined by the length of time required for drying the impregnated sheets with permissible velocities of the drying air and also by the necessity for regularity of feed. The total number of sheets under treatment in the apparatus depends upon the length of time required for drying the impregnated sheets.

Figure 12:
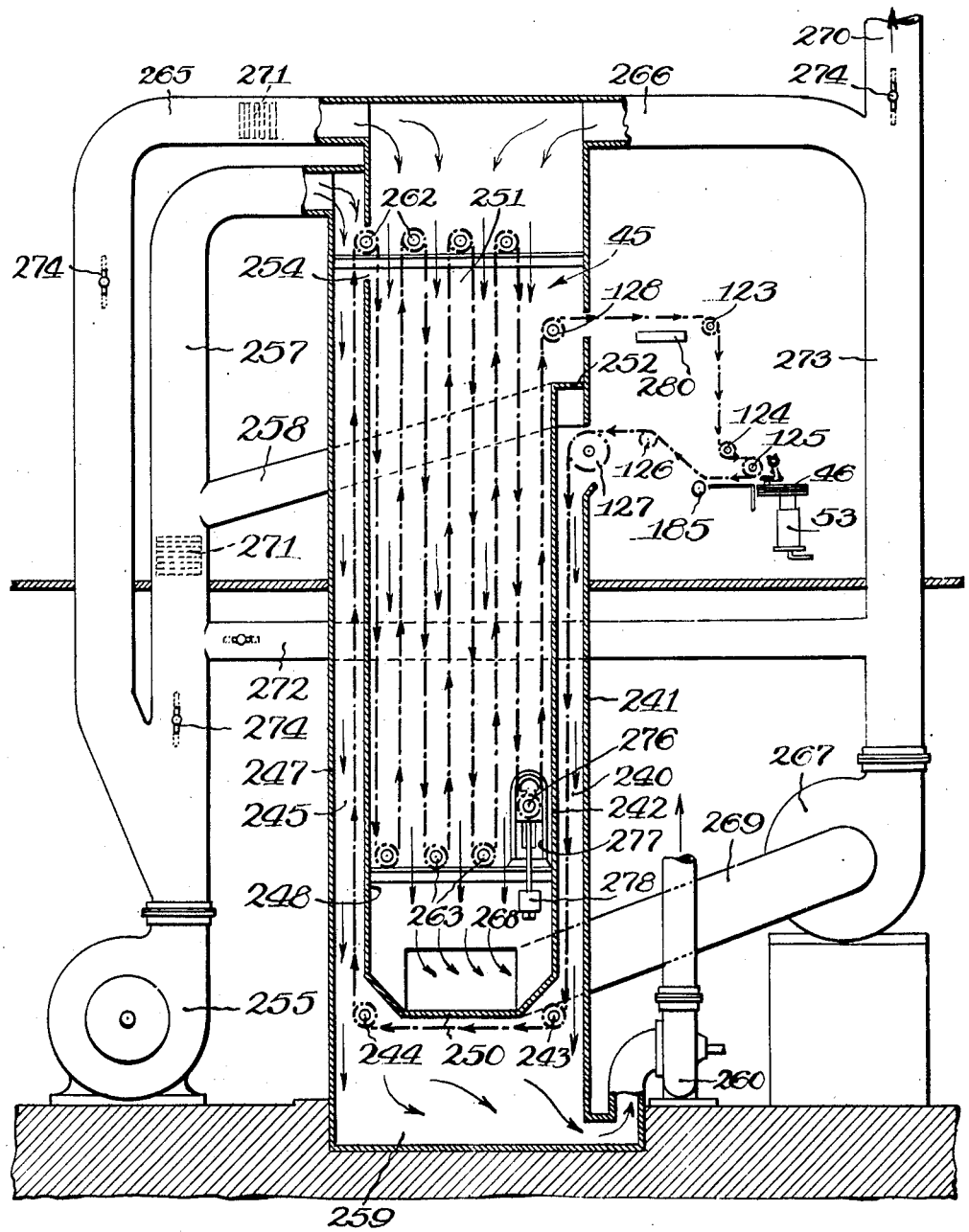
Fig. 12 is a diagrammatic view in vertical section showing the operation of the entire apparatus.

The conveyor chains are of such length as to pass over a plurality of upper and lower guide wheels in a plurality of ascending and descending sections and cause the sheets to remain within the drying chamber the required length of time, although the conveyor is continuously moving and the drying chamber is of relatively small area in cross section. The apparatus is made in two main sections, a drying chamber and its associated parts and a frame for supporting the actuating mechanism and the devices for operating on the sheets before and after they pass through the drying chamber. The devices positioned on the frame are preferably enclosed within a suitable housing indicated at 42 in Figs. 2 and 4, which may conveniently include a glass section 43, hinged as at 44 for easy access to the devices as for the replenishment of the supply of base sheets or for adjustment, and through which inspection of the operations may be had. The chamber is indicated generally at 45 in Fig. 12.

The sheets of "Yoshino", or other porous base paper, to be converted into stencil sheets may be piled in stacks 46 on each of a number of feed trays or tables 47 which extend in a row across the front or intake end of the apparatus and are supported from the side frame members 48 and 49 through a shelf or floor 50. Each of the tables includes a tray 51 which is formed with upwardly disposed side flanges 52 to support and guide the pile of sheets and is removably mounted on an elevating device 53 adapted to maintain the top of the pile 46 at a substantially constant level suitable for feeding of the sheets. This device as shown consists of a cylinder 54 closed at its upper end on which the tray 51 rests and arranged to slide telescopically within a cylinder 55, closed at its bottom end and supported by the floor 50. The cylinder 54 is centered and guided in the cylinder 55 by rollers 56. The lower portion of the cylinder 55 is filled with a suitable sealing fluid 57, such as glycerine, into which the open end of the cylinder 54 projects, defining an air space 58. An air pipe 59 projects upwardly through the closed end of the cylinder 56 into this air space 58 and is connected through a conduit 60, a control device of any suitable construction indicated at 61, and a branch conduit 62, with a manifold 63. The manifold is supplied with air under pressure from any convenient source (not shown). The control devices may include any sensitive flow-control valve, the well known Johnson valve being well suited for the purpose. As the construction and operation of such valves is thoroughly understood, specific description thereof is unnecessary. Pivotally mounted on each of the control devices 61 and forming a part thereof is an arm 64, the end of which projects over the corresponding pile 46 and constitutes a feeler which is urged lightly into contact with the upper surface of the pile by a suitable spring, not shown. These arms are adapted to contact the operating plunger of the control valve 61 as clearly shown in Figs. 2 and 4, so that when the level of the top of the pile 46 falls, by reason of the feeding of sheets therefrom, the feeler arm is depressed, the control valve opened and air under pressure from the manifold 63 is admitted through conduit 60 to the space 58. This raises the upper cylinder 54 and with it the pile 46 until the pressure of the top of the pile on the arm 64 permits the control valve to close, shutting off the air and thus arresting the upward motion of the table at the proper level. These elevating devices are highly sensitive and in practice maintain the top of the pile of sheets substantially at the predetermined feeding level within the thickness of two or three of the sheets.

The level may be adjusted as desired by bodily raising or lowering the device 61 and thus changing the point at which the feeler arm contacts the top of the pile. For this purpose the devices 61 are adjustably mounted on a support 65 as shown in Fig. 4. The bottom of the tray 51 is provided with cleats 66 adapted to engage a pedestal 67 at the top of the cylinder 54 and is also provided with guide rollers 68 which bear against guides 69 to steady and guide the motion of the tray as clearly shown in Figs. 4 and 5.

The device for successively feeding the base sheets from the top of the pile 46 to the conveyor grippers is supported from a feed shaft 71 mounted in suitable bearings 72 and 73 in the side frame members 48 and 49. This shaft 71 projects through the bearing 72 and is provided at its end by an actuating arm 74, one end of which carries a roller follower 75 engaging the periphery of an actuating cam 76. The arm 74 is extended on the opposite side of shaft 71 as indicated at 77 in Fig. 10 for attachment to a spring 78 whereby the follower roller 75 is maintained in engagement with the cam. This cam is mounted on and rotated by a shaft 79, which may be geared to and driven from the conveyor drive shaft in any convenient manner. It is so formed as to impart a non-uniform, oscillatory movement to the shaft 71. On this shaft are journaled the hubs 81 of depending feed arms 82, one for each of the trays 81, and these hubs are secured to hubs 83, fixed on the shaft 71, by screws 84, thus permitting angular adjustment of the arms with respect to the shaft. Each of the arms 82 is positioned to oscillate substantially over the longitudinal center line of its corresponding tray, as the shaft 71 is oscillated by the cam 76.

The arm 82 is bifurcated, the lower ends of its branches being turned forwardly as shown, and a feed lever 85 is pivotally mounted as at 86 between the forwardly disposed ends. The forward end of the lever 85 supports a feed shoe 87, preferably of sponge rubber or similar material, through a carrier 88 pivotally mounted on the lever as at 89 so as to permit a limited rocking movement of the shoe with respect to said lever. A spring 91 between the shoe carrier and the lever urges the shoe forwardly on the pivot 89. The feed lever 85 also has an arm 92 extending rearwardly from the pivot 86, which arm 92 is connected to the upper portion of the feed arm 82 by a toggle comprising levers 93 and 94 pivotally joined at 95. The lower end of toggle lever 93 is pivoted at 96 to the arm 92 and the upper end of toggle lever 94 is pivoted at 97 to the arm 82 between the branches thereof. A leaf spring 98, secured to the feed arm 82, bears at its free end against the toggle lever 94 urging this toggle lever toward a stop 99 formed at the bifurcation of the feed arm and operating to prevent rattle and also to bias the toggle away from its on-center position in which the pivots 97, 95 and 96 are in line.

It will be evident that as the toggle is opened forwardly or to the left as shown in Fig. 6, the angle between the arm 82 and the lever 85 is increased, lowering the feed end of lever 85 so that the feed shoe 87 may come into contact with the top of the pile of base sheets. When the toggle is closed, or straightened, the arm 92 is depressed and the arm 85 elevated, decreasing the angle between arm 82 and lever 85 so that the feed shoe is lifted from the pile 46 as shown in Fig. 7. Suitable means is provided for so operating the toggle that the lever 85, and with it the shoe 87, is lowered into operative contact with the pile on the forward or feeding motion of the arm 82 and is raised out of contact with the pile upon the rearward or return motion thereof. As illustrated, such means comprises a pair of abutments 101 and 102 adjustably mounted in a fixture or bracket 103 supported on a bar 104, which extends transversely across the front of the apparatus between frame members 48 and 49. These abutments are so adjusted that as the arm 82 swings forwardly with the toggle in the position shown in Fig. 6, the toggle lever 94 contacts the forward abutment 101 near the end of the feeding stroke, closing or straightening the toggle and lifting the lever 85. Such contact with the abutment 101, assisted by the pressure of spring 98, moves the pivot 95 rearwardly past the line of centers until the toggle lever 94 comes to rest against stop 99 in the position shown in Fig. 7. In this position the parts are carried in the rearward or return motion of the arm 82. Shortly before the end of the return swing the toggle arm 94 contacts the rear abutment 102, which breaks or opens the toggle forwardly, lowering the feed shoe 87 into contact with the pile 46 for feeding the next sheet, as previously explained. Preferably, the rear abutment 102 is so adjusted as to open the toggle and lower the feed shoe before the arm 82 has quite completed its rearward movement. The effect of this is to move the forward shoe rearwardly a short distance, while it is in frictional contact with the pile 46, causing a rearward buckle of said pile, as shown in Fig. 6. This permits air to enter beneath the uppermost sheet and prevents any adhesion to the remainder of the pile, thus lessening the danger of feeding two sheets at once.

The conveyor or transport member which functions to receive the base sheets from the feed tray, bring them into contact with the solution coated surface, convey them through the drying chamber and deposit them in the receptacle, comprises two endless continuously traveling chains 120 and 121 which carry the means for holding the sheets. The course of the chains in entering and leaving the drying chamber is indicated by the dot and dash lines on Fig. 12, the direction of travel of the chains being indicated by the arrow heads. The chains are directed in their course past the various devices on the frame by pairs of sprocket wheels indicated at 123, 124, 125 and 126, and in entering and leaving the drying chamber by the pairs of sprocket wheels 127 and 128, respectively. The sprocket wheels 125 are mounted on the shaft 79, and the sprocket wheels 124 are mounted on the shaft 130 journaled at its ends in the side frames 48 and 49. The other sprocket wheels are separately journaled in brackets suitably supported to leave the space between the pairs of wheels clear so as not to interfere with the travel of the sheets in vertical position or with the sheet supporting means.

Power is applied to the shaft 79 and also to the sprocket wheels 126 to drive the chains. The shaft 79 is driven in any convenient manner, as through a bevel gear 131, from any suitable source of power not shown.

The means on the conveyor chains for holding the sheets during the various operations performed on them comprises a series of gripper fingers mounted on supports arranged transversely between the chains and pivotally connected at their ends at opposite points on the chains. The gripper finger supports are equally spaced along the chains and the distance between two adjacent supports is such that when the supports are traveling through the drying chamber and the impregnated sheets are hanging vertically the lower ends of the sheets will not touch the next succeeding supports.

The supports are all alike in construction and mode of operation. Each support consists of a U-shaped tubular member 137 secured at its ends to the elongated plates 139 which are pivotally connected at one end with the chains 120 and 121. For this purpose the chains are provided at opposite points with special links 140 having a pivotal connection with a plate 139. By means of this pivotal connection between the plates 139 and the chains the gripper finger supports are carried along with the chains through the frame and through the drying chamber, and the sheets carried by the supports are permitted to hang vertically as the supports pass through the drying chamber.

Each pair of gripper fingers on the supports of the transport member comprises a fixed finger 143 supported from the inner surface of one wall of the tubular member 137, and a movable gripper finger 145 pivoted in ears projecting from a bracket 144 on the member 137. An expansion spring 147 acting against a tail end 152 of the movable finger piece urges the finger 145 against the fixed finger 143.

The pairs of gripper fingers on each support on the transport member are arranged in groups of two pairs, spaced to grip the base sheets at points adjacent its side edges. This arrangement enables the feed shoe to advance the sheets from the table or tray and position their edges or margins between the open gripper fingers on the supports on the transport member, this mode of operation being clearly indicated in Fig. 4.

The sheet receiving position of the gripper fingers on the transport member is substantially the point indicated by the reference character 150 in Fig. 4, it being borne in mind that the gripper fingers on the transport member are continuously traveling and that consequently they move an appreciable distance during the action of moving the sheets into position to be engaged and held by the gripper fingers on the transport member. The movable gripper fingers 145 are held in open position to receive the sheets by means of a lock plate or strip 151 one edge of which is adapted to engage the tail ends 152 of the movable fingers 145 and the other edge or margin of which is secured to the squared middle portions of a rock shaft 154 extending throughout the length of the tubular member 137. To the outer ends of rock shaft 154 is fixed a lever arm 156 carrying a weight or roll 157 on its free outer end. The movable fingers 145 are held open by the engagement of the lever arms 156 with the latch arms 158 pivoted at 159 in suitable lugs. Each latch arm 158 is provided with a shoulder 160 which is adapted to engage with a lug 161 offset inwardly from one edge of each lever arm 156, and the shoulders are held under the lugs 161 by means of suitable springs (not shown).

The feed shoe travels somewhat faster than the transport member to bring the sheets between the open gripper fingers 143 and 145, when the transport member takes the sheets and the feed shoe member releases them. The sheets are moved into position to be gripped by the fingers 143 and 145 by the time the offset outer ends of the latches 158 reach the rolls 165 mounted on the forward ends of supports 166 adjustably secured to and supported from the side frames 48 and 49. The engagement of the rolls 165 with the latches 158 disengages the latter from the lever arms 156. The rock shaft 154 is now free to turn, thereby permitting the springs 147 to close the movable fingers 145 against the under surface of the rear margins of the base sheets and clamp the base sheets against the fixed fingers 143.

Simultaneously with or immediately after the latches 156 encounter the rolls 165, the toggle levers contact the stop 101 and the feed lever 85 is actuated to raise the shoe 87 and release the base sheet.

In order to assure the accurate positioning of the rear edges of the base sheets between the open gripper fingers 143 and 145 on the transport member as the latter is moving it is necessary to guide the chains and the gripper finger supports thereon with a considerable degree of precision in order that all the fixed fingers 143 will travel in substantially the same plane, a plane slightly above the plane of the top surface of the pile of base sheets. To secure this precision of travel of the gripper fingers on the supports of the transport member, and the chains 120 and 121 are guided at this point between the vertically arranged plates 181 and 182 supported from the inner sides of the side frames 28 and 29 by the brackets 183; and the gripper finger supports are guided in the following manner: one end of the elongated plates 139 is provided with a roll 186 and the other end with a roll 187 which travel on the upper edge of vertically arranged plates 188 supported from the lower edge of the plates 181 and located on the inner side thereof, as is clearly indicated in Figs. 4 and 6. The upper surfaces of the rolls 187 are engaged by the lower edge 189 of the vertical plates 167. The plates 181 and 182 guide the chains and gripper finger supports over the solution coated surface 185 so that the base sheets will be dragged over and in contact with it. At the point above the surface 185 the plates 181 and 182 are directed obliquely upwardly as shown in Fig. 4. The guide plate 188 extends horizontally as far as the surface 185 and then turns obliquely upwardly with the plates 181 and 182. The horizontal section of the plates 188 supports both rolls 186 and 187, whereas when the gripper finger support turns upwardly along the oblique section 190 of the plates 188, the rolls 186 leave the plates 190 and only the rolls 187 remain in engagement therewith to assure the proper contacting of the base sheets with the surface 185. The lower edge 189 of the vertical plates 167 terminate a short distance beyond the point at which the gripper fingers on the supports on the transport member receive the base sheets, since it is thereafter unnecessary to guide the upper surfaces of the rolls 186 and 187.

The gripper fingers on the transport member now carry the base sheets into contact with the surface 185 coated with the solution of type-impressible material, which surface in the present embodiment of the invention is the periphery of a transversely arranged cylinder. As the feed shoe conveys the base sheets from the pile 46 to the gripper fingers on the transport member and the gripper fingers on the transport member take the sheets and convey them to the cylinder 185, the sheets are supported in horizontal position by means of the longitudinally arranged slats 192 which extend from the edge of the table to a point in front of the cylinder 185, and are supported in any convenient manner, as by a bracket 193 secured to the side frame members 48 and 49. Paper leaders or guides 194, pivotally supported on frames 195 between the tables, to prevent curling of the edges of the sheets during the feeding from the pile.

The cylinder or roll 185 extends across the path of travel of the four base sheets held by the gripper fingers on the transport member so as to impregnate or coat all four sheets with type-impressible material simultaneously. The cylinder is mounted on a suitable shaft 206 journaled in the upper edges of the end walls of a tank 207, and is driven by suitable gearing (not shown) from the shaft 79.

Within the tank 207 is located an inner tank or reservoir 208 for containing the solution of type-impressible material 209 in which the lower part of the cylinder 185 is immersed, and this tank 208 is supplied with the solution through a pipe 210 which enters the bottom of tank 208. The surface of the cylinder is kept properly cleaned by a scraper 220 fixed in the upper end of a weighted member 221, pivotally supported at its ends from the end walls of the tank. The space between the outer tank 207 and the inner tank 208 is filled with a heating fluid 223 admitted at 224 and discharged at 225.

As the gripper finger support travels up the inclined plates 181, 182 and 190, the remainder of the base sheet continues in close contact with the solution coated cylinder, although the pull of the gripper fingers on the sheets is at an angle to the direction of travel of the un-impregnated portions of the sheets, these continuing to lie flat on the rear ends of the slats 192 until they are drawn over and into contact with the cylinder. By the time the last portions of the sheets come into contact with the cylinder and leave the cylinder the rolls 187 reach the upper ends of the inclined sections 190 of the plates 188, and the gripper finger support is thereby permitted to swing on its pivoted connection with the chains 120 and 121, to permit the impregnated sheets to hang vertically.

The freshly impregnated sheets are now in condition to be conveyed through the drying chamber to evaporate or dry out the solvent from the type-impressible material with which the sheets are coated. The drying chamber 45 is preferably divided vertically into a plurality of compartments in order that the sheets passing through the chamber may be subjected to somewhat different treatments according to the length of time they have been in the chamber. For example, the freshly impregnated sheets are conveyed downwardly through the first compartment 240 formed by the end wall 241 of the chamber and a partition wall 242. The conveyor chains pass over suitable sprocket wheels 243 and 244 located in the bottom of the chamber and direct the freshly impregnated sheets up through a second compartment 245 formed between the end wall 247 of the chamber and a partition wall 248. The compartment 240 is restricted to a single descending line of impregnated sheets and the compartment 245 is restricted to a single ascending line of impregnated sheets. Inasmuch as the solvent is still fresh on the surfaces of the impregnated sheets passing through these compartments they are separated from the remainder of the drying chamber, the partitions 242 and 248 being connected at the bottom by a base plate 250, and the upper end of the compartment 240 being separated from the middle compartment 251 of the chamber by means of the top wall 252. The upper end of the partition wall 248 is broken at the point 254 to permit the conveyor chains to pass into the middle compartment 251.

Streams of air are directed downwardly through the compartments 240 and 245 from a blower 255 provided with a branch or duct 257 discharging downwardly into the compartment 245 and a branch or duct 258 discharging downwardly through the compartment 240. The solvent laden air is withdrawn from the pocket 259 in the lower part of the chamber 25, and into which the compartments 240 and 245 open, by means of a fan 260 which discharges to the atmosphere or to a convenient point where the solvent may be recovered if desired.

The middle portion or compartment 251 of the drying chamber is provided with a series of upper sprocket wheels 262 and a series of lower sprocket wheels 263 arranged in staggered relation with the sprocket wheels 262 to direct the conveyor chains into a series of return bends or convolutions to secure a maximum of lineal travel of the impregnated sheets in a minimum of cross sectional area. The sheets being conveyed through the middle compartment 251 of the chamber receive downwardly directed streams of air from a branch pipe 265 of the blower 255 and the branch pipe 266 of an exhaust fan 267. The exhaust blower 267 withdraws the air from a pocket 268 at the bottom of the middle compartment 251 through the pipe 269. A portion of this withdrawn air is recirculated through the compartment 251 by means of the pipe 266, and a portion of it is discharged through the branch pipe 270. In the branch pipes 257 and 265 are located the heaters 271 for tempering the air to the desired degree. The branch pipe 257 from the blower 255 is provided with a short circuit pipe 272 connecting with the pipe 273 leading from the exhaust fan 267 to dilute the air passing through the pipe 273 and returned to the middle compartment 251 through the pipe 266. The dampers 274 are provided at various points in the pipes to control the amount of air permitted to pass through them. By the time the impregnated sheets reach the sprocket wheels 128 at the exit from the chamber they are properly dried. The last pair of sprocket wheels 276 forming the last two sections or bends in the conveyor chains are slidingly mounted in brackets or guides 277 and are provided with the weights 278 (only one being shown) which hold the chains taut.

As the gripper fingers supports emerge from the exit adjacent the sprocket wheels 128, the supports are again brought into horizontal position. When the sheets have been drawn into position over the receptacle 280, the latch mechanism is released by any convenient means, not shown, and the sheets are brought into oblique position—to facilitate their falling into the receptacle.

When a gripper finger support has deposited its sheets in the receptacle 280 it is in condition to return to point 150 to receive a fresh batch of base sheets from the feed shoes. The supports are guided from the receptacle to point 150 as follows:—The chains 120 and 121 first pass over the pairs of sprocket wheels 123 located just forward of the receptacle and on the plane of sprocket wheels 128. From the sprockets 123 the chains descend to sprocket wheels 124 and then go forward and around sprocket wheels 125. At the bend adjacent the sprockets 123 and the rolls 186 and 187 may be guided by suitable strips if desired.

The operation of the apparatus will be evident from the foregoing description. The operator places a supply of base sheets on the table and the machine is started, the feed of the base sheets to the conveyor grippers and the subsequent impregnation and drying thereof being continuous and automatic, and requiring no attention other than the periodic removal of the stencil sheets from the receptacle 280. As the feed of the base sheets from each pile is independent of manual attention, the apparatus may be operated at higher speeds and without the loss of production consequent upon failure to supply each set of grippers with a base sheet.

Moreover, the freedom from manual attention secured by this invention permits the housing of the entire feed end of the apparatus, thus protecting the base sheets from dust and from the effects of changes in atmospheric moisture, thus improving both the regularity of the feed and the quality of the product.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent, is:

1. In an apparatus for making type-impressible stencil sheets from base sheets, a continuously moving conveyor having gripper means for holding a sheet, an oscillatory feed arm, a feed lever pivotally mounted on said arm, a feed shoe carried by said lever, and toggle means operable to lower said lever on forward movement of the arm and to raise said lever on rearward motion of the arm.

2. In an apparatus of the character described and having a pile of sheets to be fed, a continuously moving conveyor having gripper means for holding a sheet, a feed arm mounted to oscillate above said pile, a feed lever pivotally mounted on said arm, a feed shoe carried by said lever, toggle members connected between said lever and said arm, and abutments adapted to actuate the toggle members to raise and lower the lever.

3. In an apparatus of the character described and having a pile of sheets to be fed, a continuously moving conveyor having gripper means for holding a sheet, a feed arm mounted to oscillate above said pile, a feed lever pivotally mounted on said arm, a feed shoe at one end of the lever, toggle members connected between the other end of said lever and the arm, and adjustable abutment means in the path of oscillation to actuate the lever at predetermined points in the travel of the arm.

4. In an apparatus of the character described and having a pile of sheets to be fed, a continuously moving conveyor having gripper means for holding a sheet, a feed arm mounted to oscillate above said pile, a feed lever pivotally mounted on said arm, a feed shoe carried by said lever to frictionally forward the top sheet of said pile to the gripper means on forward movement of the arm and to buckle the next succeeding sheet on rearward movement thereof.

5. In an apparatus of the character described and having a pile of sheets to be fed, a conveyor having gripper means for holding a sheet, an oscillatory feed shaft, a feed arm carried by said shaft, a feed shoe, and toggle means carried by said feed arm adapted to lower the shoe into frictional engagement with the pile upon forward movement of the arm and to raise it above the pile upon rearward movement thereof.

6. In an apparatus of the character described, a conveyor having gripper means for holding a sheet, an oscillatory feed shaft, a feed arm carried by said shaft, a feed shoe, a shoe operating device carried by said feed arm, and means to oscillate said feed shaft in timed relation to the progression of the gripper means.

7. In an apparatus of the character described having a sheet transporting conveyor and piles of sheets to be fed thereto, an oscillatory feed device for each pile, a fluid pressure elevator for each pile supplied from a common source, and a control device for each elevator operable in response to changes in level of the top of the corresponding pile.

150

8. In an apparatus for making type-impressible stencil sheets from base sheets including a conveyor having gripper means for holding a sheet, a pile of sheets to be fed arranged adjacent said conveyor and an elevating device supporting said pile adapted to maintain the top thereof at a predetermined level, an oscillatory feed shaft above said pile, a feed arm carried by the shaft, a feed device including toggle members carried by said arm and a feed shoe adapted to frictionally contact the top sheet of the pile, and means to oscillate the shaft in timed relation to the progression of gripper means on the conveyor.

9. In an apparatus for making type-impressible stencil sheets from base sheets, a conveyor having gripper means for holding a sheet, a pile of sheets to be fed arranged adjacent said conveyor, and an oscillatory feed device adapted to advance the top sheet of the pile to the gripper means in succession, an elevating device supporting said pile comprising a pair of cylinders coaxially arranged in telescopic relation and closed at their outer ends to define an air space, means to supply air under pressure to said air space, and control means including a feeler member engaging the top of said pile and operable to interrupt the supply of air at a predetermined level of said pile.

10. In an apparatus of the character described having, a conveyor for transporting sheets through the apparatus from a pile of base sheets, means for automatically feeding sheets singly in succession from said pile to the conveyor comprising a rock shaft above said pile, a depending feed arm adjustably secured to said shaft, a feed lever pivotally secured intermediate its ends to the end of said arm, a sponge rubber feed shoe pivotally mounted at one end of said lever and adapted to frictionally engage the top sheet of the pile, a toggle device connected between the other end of the lever and the arm, means to urge said toggle device past its center position, adjustable abutments in the path of the arm to operate the toggle near the ends of movement of the arm to raise and lower the lever and shoe, and means to oscillate the rock shaft in timed relation to movement of the conveyor.

11. In an apparatus for making type-impressible stencil sheets from base sheets arranged in a pile, a continuously moving conveyor for transporting sheets through the apparatus, gripper means carried by said conveyor including pairs of fixed and movable fingers operable to close on and hold a sheet, a feed shoe adapted to frictionally advance the top sheet of the pile to a position between the fingers of a pair of grippers, means to actuate said feed shoe in timed relation to the progression of the grippers, and means to raise the feed shoe as said fingers close on the sheet.

12. In an apparatus of the character described and having a pile of sheets to be fed, a continuously moving conveyor having gripper means for holding a sheet, a feed arm mounted to oscillate above said pile, a feed lever pivotally mounted on said arm, a feed shoe carried by said lever, toggle members connected between said lever and said arm, and means to actuate the toggle members to raise and lower the lever at predetermined points in the movement of the arm.

13. In an apparatus for making type-impressible stencil sheets from base sheets, a continuously moving conveyor having gripper means for holding a sheet, an oscillatory feed arm, a feed lever pivotally mounted on said arm, a feed shoe carried by said lever, and means carried by said arm to lower said lever on forward motion and to raise said lever on rearward motion of the arm.

ERNEST J. BRASSEUR.